United States Patent
Ray

(10) Patent No.: US 11,324,233 B2
(45) Date of Patent: May 10, 2022

(54) MEAT LIKE PET FOOD CHUNKS

(71) Applicant: USPET Nutrition, LLC, Fair Haven, NJ (US)

(72) Inventor: Thomas Kent Ray, Claremont, CA (US)

(73) Assignee: USPET Nutrition, LLC, Fair Haven, NJ (US)

( * ) Notice: Subject to any disclaimer, the term of this patent is extended or adjusted under 35 U.S.C. 154(b) by 1365 days.

(21) Appl. No.: 14/707,297

(22) Filed: May 8, 2015

(65) Prior Publication Data

US 2015/0320085 A1 Nov. 12, 2015

Related U.S. Application Data

(60) Provisional application No. 61/990,880, filed on May 9, 2014.

(51) Int. Cl.
*A23J 1/00* (2006.01)
*A23J 1/08* (2006.01)
(Continued)

(52) U.S. Cl.
CPC .............. *A23J 1/006* (2013.01); *A23J 1/08* (2013.01); *A23K 10/20* (2016.05); *A23K 10/30* (2016.05); *A23K 20/147* (2016.05); *A23K 20/163* (2016.05); *A23K 20/174* (2016.05); *A23K 20/20* (2016.05); *A23K 40/00* (2016.05);
(Continued)

(58) Field of Classification Search
CPC ........... A23J 1/08; A23J 1/006; A23K 20/163; A23K 40/00; A23K 10/20; A23K 50/48; A23K 20/174; A23K 20/147
See application file for complete search history.

(56) References Cited

U.S. PATENT DOCUMENTS 3,962,481 A 6/1976 Kumar
4,038,432 A 7/1977 Hildebolt et al.
(Continued)

FOREIGN PATENT DOCUMENTS

CA 2035476 9/1997
EP 0195555 A1 9/1986
(Continued)

OTHER PUBLICATIONS

Tornberg "Effects of heat on meat proteins—Implications on structure and quality of meat products". Meat Science 70 (2005) pp. 493-508. (Year: 2005).*
(Continued)

*Primary Examiner* — Erik Kashnikow
*Assistant Examiner* — Assaf Zilbering
(74) *Attorney, Agent, or Firm* — William A. Hector; Venable LLP

(57) ABSTRACT

The present invention relates in general to the field of pet food. In particular the present invention relates to a meat like chunk that can be incorporated into a complete pet food. One embodiment of the present invention is a method of using multiple scraped surface heat exchangers and a steam tunnel to produce a meat like chunk. Another embodiment is a composition of meat ingredients, dried egg product, egg whites, and pea protein that results in a meat like chunk having an improved appearance that closely resembles that of actual pieces of meat.

12 Claims, 3 Drawing Sheets

(51) Int. Cl.
   *A23K 20/20*    (2016.01)
   *A23K 10/30*    (2016.01)
   *A23K 20/163*   (2016.01)
   *A23K 40/00*    (2016.01)
   *A23K 10/20*    (2016.01)
   *A23K 20/174*   (2016.01)
   *A23K 50/42*    (2016.01)
   *A23K 20/147*   (2016.01)
   *A23K 50/48*    (2016.01)
   *A23L 13/40*    (2016.01)

(52) U.S. Cl.
   CPC .............. *A23K 50/42* (2016.05); *A23K 50/48* (2016.05); *A23L 13/42* (2016.08); *A23L 13/424* (2016.08); *A23L 13/426* (2016.08); *A23L 13/432* (2016.08)

(56) References Cited

U.S. PATENT DOCUMENTS

| | | |
|---|---|---|
| 4,044,661 A | 8/1977 | Balaz |
| 4,200,041 A | 4/1980 | Hildebolt et al. |
| 4,784,862 A | 11/1988 | Wotherspoon |
| 4,943,441 A | 7/1990 | McCabe |
| 5,433,968 A | 7/1995 | Zarraga et al. |
| 5,474,790 A * | 12/1995 | Franklin ................ A23L 13/30 426/417 |
| 5,792,504 A | 8/1998 | Poppel et al. |
| 5,945,152 A | 8/1999 | Purser |
| 2007/0148323 A1* | 6/2007 | Dingman ............... A23K 10/20 426/646 |
| 2010/0166935 A1 | 7/2010 | Peskin et al. |
| 2012/0237648 A1 | 9/2012 | Ortiz |

FOREIGN PATENT DOCUMENTS

| | | |
|---|---|---|
| PH | 26746 | 9/1992 |
| WO | 2012/139725 A1 | 10/2012 |

OTHER PUBLICATIONS

Ishiwatari et al., "Effect of Protein Denaturation degree on texture and water state of cooked meat". Froun Journal of Food Engineering 117 (2013) 361-369 (Year: 2013).*

International Search Report and Written Opinion in corresponding International Application No. PCT/US2015/029857 dated Jul. 24, 2015 (14 pages).

International Preliminary Report on Patentability in corresponding International Application No. PCT/US2015/029857 dated Nov. 15, 2016 (10 pages).

"Popular Dog Food Calorie Contents"; Available online at www.franklinanimalclinic.vet; 2009.

Jiangtao Lin et al; "Bulk and Surface Chemical Composition of Wheat Flour Particles of Different Sizes"; Hindawi Journal of Chemistry; vol. 2019; Published Apr. 22, 2019; Article ID: 5101684; 11 pages; http://doi.org/10.1155/2019/5101684.

* cited by examiner

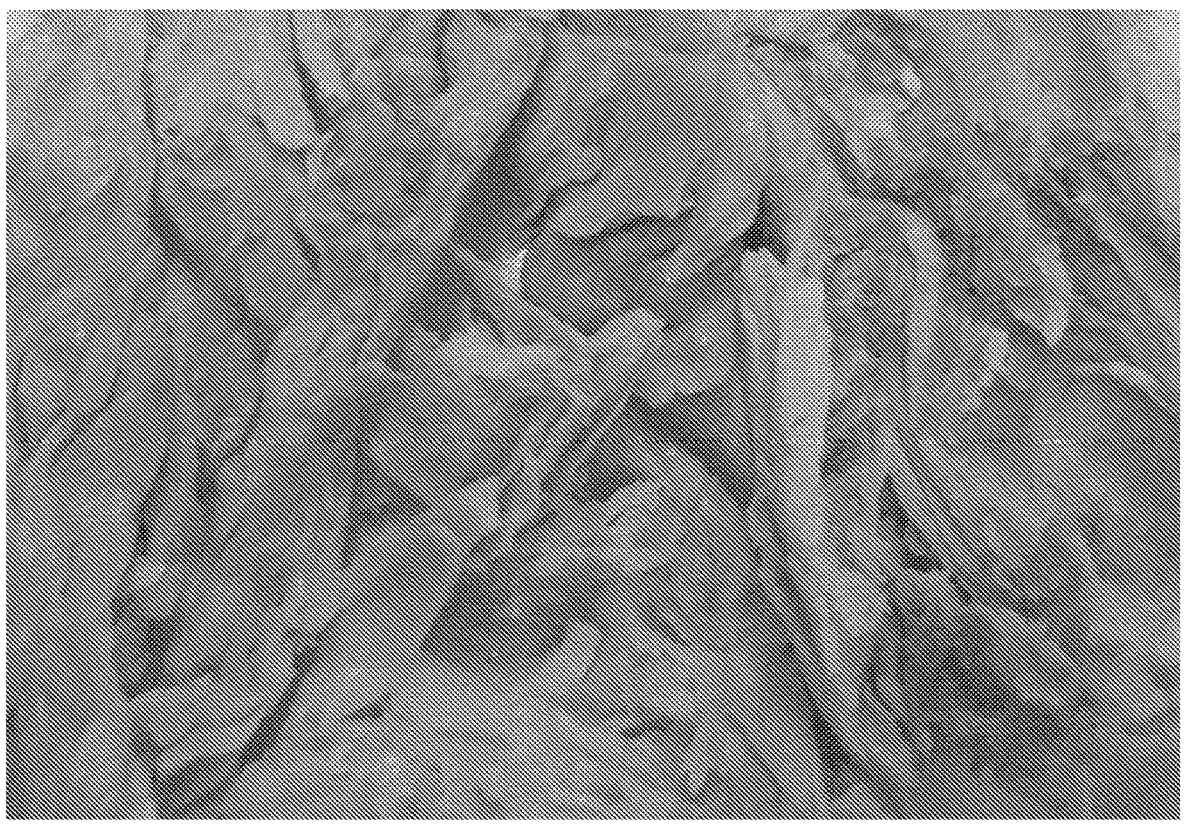
FIG. 1
FIG. 2
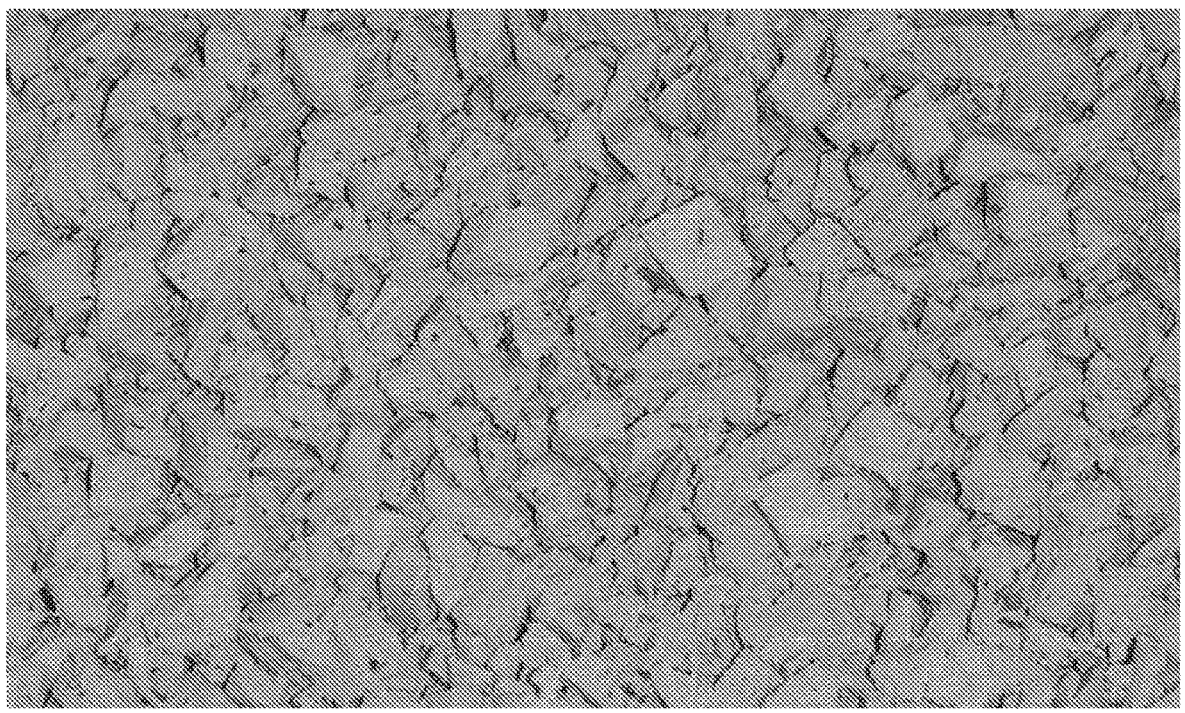

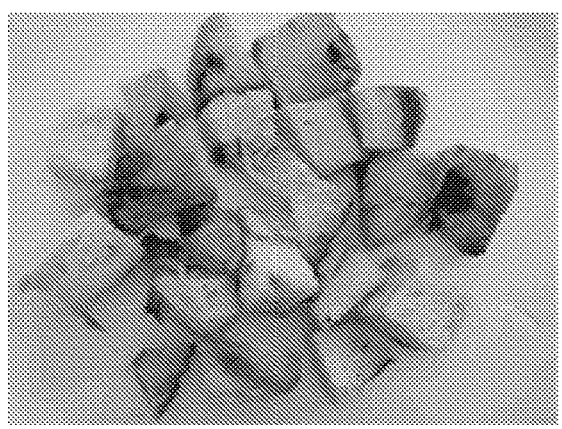
FIG. 3
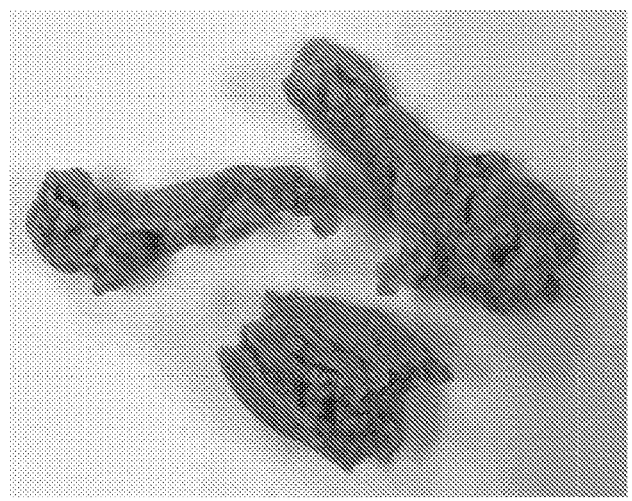
FIG. 7
FIG. 4
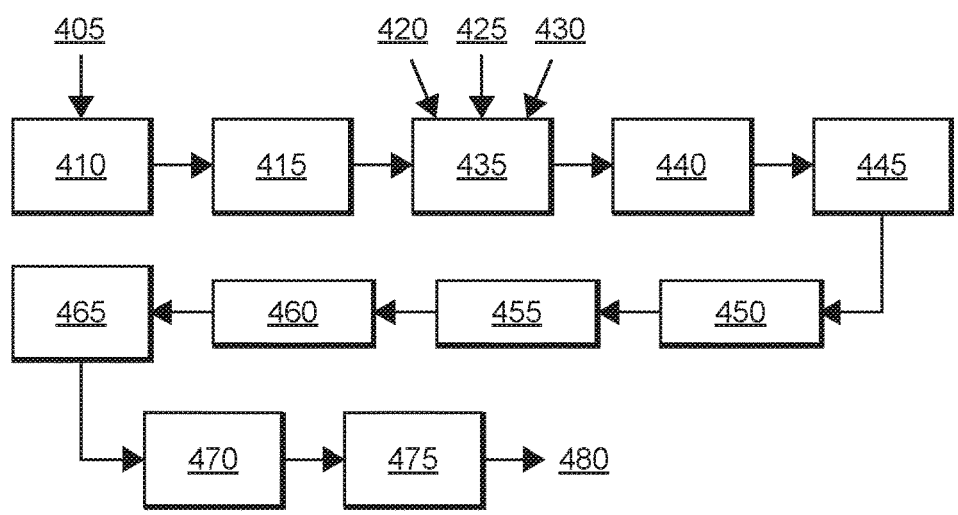

MEAT LIKE PET FOOD CHUNKS

This application claims the benefit of U.S. Provisional Application No. 61/990,880, filed on May 9, 2014. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is pet food. In particular, the present invention relates to chunks having a meat like appearance and texture and methods of making the chunks.

BACKGROUND

The background description includes information that may be useful in understanding the present invention. It is not an admission that any of the information provided herein is prior art or relevant to the presently claimed invention, or that any publication specifically or implicitly referenced is prior art.

The making of chunks is generally known within the pet food industry. Typically these chunks are prepared by mixing, chopping and emulsifying a mixture of raw meat ingredients such as beef, pork, lamb and chicken obtained from the muscle tissue and meat by-products. These raw meat ingredients are then mixed with various dry ingredients (e.g., vegetable by-products, starches, vitamins, minerals, gums, glutens) to make a meat emulsion. The resulting meat emulsion is then extruded into a continuous "rope" or "slab/sheet" that is transferred into a steam tunnel.

While in the steam tunnel, the meat emulsion "rope" or "slab/sheet" is cooked by exposing it to heat (i.e. brought to temperature in excess of 175° F. (79° C.)) and steam. A steam tunnel has steam applied to either the top or bottom or both sides of the product. After about five minutes in the tunnel, the rope is chopped into pieces generally of similar size and shape. These pieces tend to be uniform and thus look "processed" and not like real chunks of meat.

Attempts have been made to improve the appearance and texture of such meat products. For example, U.S. Pat. No. 3,962,481 (to Kumar) describes a process for improving the texture of such a protein product by precipitating the protein with alkali to form a gelatinous mass, which is neutralized with acid, shaped, and treated with hot oil. The resulting texture is a result of complex interactions between the nature of the protein starting material, the acid used, the oil used, and the time and temperature of exposure. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

U.S. Pat. No. 4,038,432 (to Hildebolt et al) describe a process that produces fibrous structures that provide texture to mixtures of vegetable (primarily soy) and animal proteins by passing a slurry of such proteins, under pressure, through a cooking tube with a constriction. Following recovery of the continuous strand of processed protein from a pressure let-down area the product can be diced to produce chunks of a meat "analog" with a fibrous texture.

For example, CA Patent No. 2,035,476 (to Reimann et al) describes the use of a device that extrudes a meat emulsion containing animal proteins with different coagulation behaviors through a narrow gap between the plates of a high speed emulsifier. This produces a partially coagulated material that is transferred to a heated process tube to produce a continuous strand with some preservation of meat texture. Care must be taken, however, to prevent coagulation from occurring prior to introduction of the meat emulsion to the emulsifier.

U.S. Pat. No. 5,433,968 (to Zarrage and Guat) discusses a process for converting soy protein into a meat analog product that has a meat like, layered texture. This is accomplished by providing a thick slurry of soy protein to a gap between plates of a high speed emulsifier, rapidly heating the slurry, and transferring the mixture to a long process tube. Coagulation of the slurry produces a continuous loaf with the soy protein presented as bonded layers.

None of these, however, provide for the introduction of multiple texture and appearance enhancing structural features within the processed meat product. In addition some of these require the introduction of vegetable proteins in large amounts, which is undesirable in many applications (for instance, in producing a diet for an obligate carnivore such as a dog or cat).

Accordingly, there remains a need for improved methods of introducing texture and other natural meat like characteristics to such processed meat products, particularly in relatively high volume in a cost-effective manner. Improved processing methods and formulations that result in an appearance that is more meat like and less "processed" is of growing interest to consumers. Production of the chunks also needs to assure that pieces are cooked consistently and that they retain their integrity through retorting. Developing a process that produces a meat like chunk that can be used in a variety of finished products, not just wet pet food, would also be advantageous. Still other challenges that exist include developing processes that are suitably robust for the wide variety of ingredients desirable for use in pet food production.

Thus, there still remains the problem of producing aesthetically pleasing chunks that can be incorporated into a complete and balanced pet food.

SUMMARY OF THE INVENTION

The inventive subject matter provides apparatus, systems and methods that provide a meat like chunk having striations, a fibrous structure, and shape that closely resembles meat. The process utilizes multiple scraped heat exchangers arranged in series to process a meat slurry, producing an irregular, randomly shaped meat like chunk that closely resembles natural meat products in shape, texture, and appearance. Such a meat like chunk is utilized as a component of both dry and wet pet foods.

One embodiment of the inventive concept is a meat like chunk that includes a processed slurry that is derived, at least in part, from meat obtained from animal muscle and a binding agent (for example, a starch). The meat like chunk has both striations and fibrous structures that closely resemble those of meat obtained from skeletal muscle, and has an irregular, random shape. In some embodiments such a meat like chunk includes animal protein from non-meat sources, for example proteins from eggs. In other embodiments such a meat like chunk includes proteins from vegetable sources, for example peas. In still other embodiments such a meat like chunk includes vitamin and/or mineral supplements.

Another embodiment of the inventive concept is a method for producing a meat like chunk as described above. Such a method begins by fragmenting a block of frozen meat obtained from animal skeletal muscle (for example, frozen beef and/or chicken) to generate meat fragments. These meat fragments are blended with a binding agent (and, optionally other ingredients such as an egg product and/or a vegetable protein) to generate a meat slurry. This meat slurry is moved through a first scraped heat exchanger under pressure (for example 180 psi or higher) to produce a first heat treated meat product. Heating within the first scraped heat exchanger (for example, through the application of heat to the scraped heat exchanger and/or friction) raises the temperature of the first heat treated meat product to at least 54° C. This first heat treated meat product is then transferred to a second scraped heat exchanger for further processing. The output from this second scraped heat exchanger can be transferred to a third scraped heat exchanger. Alternatively, the output of the second scraped heat exchanger can be transferred to a steam tunnel (or a similar transport oven) to complete the cooking process. In some embodiments, the third scraped heat exchanger completes the cooking process; in other embodiments the output from the third scraped heat exchanger is transferred to a steam tunnel (or a similar transport oven) to complete the cooking process. The cooked product is transferred to a dicer for final shaping, which results in a meat like chunk with striations and a fibrous structure that has a random, irregular shape and that closely resembles meat.

Another embodiment of the inventive concept is a wet pet food that includes a meat like chunk, a gravy, and an edible, visible inclusion. The meat like chunk includes a processed slurry derived from meat obtained from animal muscle and a binding agent. The meat like chunk has both striations and fibrous structures, and has an irregular, random configuration such that it closely resembles meat. In some embodiments the edible, visible inclusions include plant products, such as tomatoes, apples, avocados, pears, peaches, cherries, apricots, plums, grapes, oranges, grapefruit, lemons, limes, cranberries, raspberries, blueberries, watermelon, cantaloupe, muskmelon, honeydew melon, strawberries, banana, sweet potatoes, carrots, peas, lentils, peppers, green peppers, and red peppers.

Another embodiment of the inventive concept is a dry pet food that includes a meat like chunk and a dry edible inclusion. The meat like chunk includes a processed slurry derived from meat obtained from animal muscle and a binding agent, and has a moisture content of 12% or less. The meat like chunk has both striations and fibrous structures, and has an irregular, random configuration such that it closely resembles meat. In some embodiments the dry edible inclusion is a kibble (such as dog kibble or cat kibble). In other embodiments the dry edible inclusion is a dry plant product, such as dried green beans, dried carrots, dried apples and dried bananas. In still other embodiments, the dry pet food includes both kibble and dry plant products as dry edible inclusions.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 is a photograph of typical meat like chunks of the inventive concept.

FIG. 2 is a photograph of a prior art meat chunk.

FIG. 3 is a photograph of actual meat chunks obtained from chicken breast meat, representing an ideal chunk form.

FIG. 4 schematically depicts an exemplary process for producing a meat like chunk of the inventive concept.

FIG. 7 is a photograph of typical meat like chunks of the inventive concept after drying.

DETAILED DESCRIPTION

Figure 5:
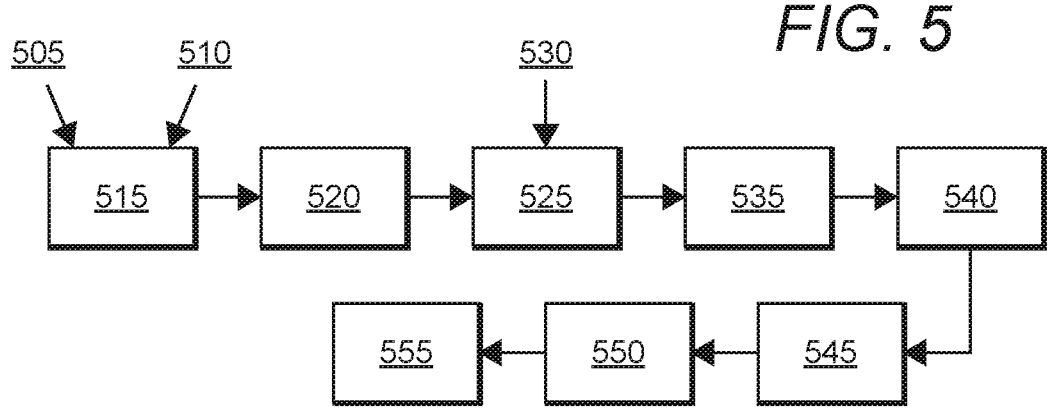
FIG. 5 schematically depicts an exemplary process for producing a wet pet food utilizing meat like chunks of the inventive concept.

The following description includes information that may be useful in understanding the present invention. It is not an admission that any of the information provided herein is prior art or relevant to the presently claimed invention, or that any publication specifically or implicitly referenced is prior art.

The inventive concept described herein provides a natural appearing meat like chunk produced from a meat slurry, processes for making such a meat like chunk, and processes for incorporating such a meat like chunk into a variety of animal feed products. One should appreciate that the disclosed methods provide many advantageous technical effects including readily scalable production of protein-rich animal feed that closely approximates both the appearance and texture of actual meat chunks from inexpensive raw materials.

It should be appreciated that percentages and ratios are calculated by weight unless otherwise indicated. All percentages and ratios are calculated based on the total composition unless otherwise indicated. Various objects, features, aspects and advantages of the inventive subject matter will become more apparent from the following detailed description of preferred embodiments, along with the accompanying drawing figures in which like numerals represent like components.

The following definitions are useful in understanding the descriptions of embodiments of the inventive concept.

As used herein, the articles including "the", "a" and "an" when used in a claim or in the specification, are understood to mean one or more of what is claimed or described.

As used herein, the terms "include", "includes" and "including" are meant to be non-limiting.

As used herein, the term "chunk" alone includes a unitary piece consisting of at least one protein source mixed with a binder ingredient that can be included as a component of animal feeds, such as dog and cat feeds. Through the chunk making process described herein the meat source and binder are transformed into a "meat like chunk" that closely resembles a chunk of actual meat. A "meat like chunk" can be understood as a product, produced from a protein source and a binder, that includes striations, variations in color, and/or variations in one or more linear dimensions between individual meat like chunks that provide many of the visual and/or textural features associated with natural meat. The meat like chunk of meat can be further cut or pulled apart such that it resembles shredded chicken, pulled pork, roast beef chunks or cut pieces of striated meat. Such meat like chunk can be provided as a moist with a moisture content of greater than about 25%, greater than about 30%, greater than about 35%, greater than about 40%, greater than about 50%, or more. Throughout this application, unless stated otherwise, % amounts are understood to indicate w/w percentages. Alternatively, a meat like chunk of the inventive process can be provided as a relatively dry product, with a moisture content of less than about 25%, less than about 15%, less than about 10%, less than about 5%, or even less. In some embodiments, such relatively dry meat like chunks have a moisture that is less than about 10% but greater than about 2%. Pieces consisting of less than 10% moisture can be referred to as "chips." Meat like chunks can range in texture from hard and dry to the touch (yet pliable) to soft and moist.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Similarly, the recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, the term "sizing device" means a mechanical device used to create acceptable size pieces that preserve or provide a random and natural meat like appearance for the meat like chunks. Typically, pieces are cut into about 1 cm, about 1.5 cm, about 2 cm, about 2.5 cm, about 3 cm, about 3.5 cm, about 4 cm, about 4.5 cm, about 5 cm, or more in any single dimension with each remaining dimension being less than about 2 cm, about 1.5 cm, about 1 cm, about 0.5 cm, or less. An example of a suitable sizing device is a dicer, such as the Urschel M6 dicer.

As used herein, the term "scraped surface heat exchanger" describes a mechanical device having a heated surface and a device for dislodging material from the heated surface by scraping, suitable for forming meat like chunks. For example, a scraped surface heat exchanger can include a tubular device with a heated jacket surrounding its outer wall, through which heat is transmitted. Such a tubular device can include a center rotor with scrapers affixed to it. When such a center rotor rotates the scrapers can pull product away from an inner wall of the tubular device. In use, a mixture of ingredients can be fed into one end of the tubular device and pushed through in a first in, first out manner. The heating and the motion through the annular space between the heated inner wall of the cylinder and the center rotor results in a transformation of the mixture.

As used herein, the terms "animal" and "pet" means a domestic animal including, but not limited to domestic dogs, cats, horses, cows, ferrets, rabbits, pigs and the like. Domestic dogs and cats are particular examples of pets.

As used herein, the terms "animal feed", "animal feed compositions', animal feed kibble", "pet food" or "pet food composition" mean a composition intended for ingestion by a pet. Pet foods may include, without limitation, nutritionally balanced compositions suitable for daily feed, as well as supplements (e.g., treats) which may or may not be nutritionally balanced. The term "kibble" as used herein refers to pellets made of ground meal, meat, or other ingredients, used especially for pet food.

As used herein, the term "starch component" means a composition based on carbohydrates that are digestible by mammalian digestive enzymes. Non-limiting examples include corn, potato, rice, sorghum, barley, wheat and oats. Such a starch component can be selected to be digestible or readily tolerated by an obligate carnivore.

As used herein, the term "humectant" means a hygroscopic substance used to help a product retain water. Non-limiting examples include glycerin, propylene glycol, sorbitol, mannitol, maltitol, lactitol, polydextrose, triacetin, erythritol, xylitol, sodium lactate and potassium lactate.

Embodiments of the inventive concept include chunks having a meat like appearance and texture and methods of making the meat like chunks. A meat like chunk can have naturally occurring meat ingredients as a primary (i.e. majority) constituent, and can include a binding agent (such as a starch) in minor (i.e. less than 5%) amounts. In some embodiments, meat like chunks can include additional materials, including non-meat animal products (including egg and/or milk constituents), vegetable proteins, and/or vitamin/mineral supplements. According to various embodiments, a meat like chunk can be formed from between about 25% to about 60% meat ingredients, between about 14% and about 32% dried egg product, between about 0.1 to about 10% egg whites, between about 1% and about 10% pea protein, between about 0.2% and about 3% vitamins and minerals, between about 0.2% and about 3% starch and between about 20% and about 30% added water.

In embodiment that include egg components, such egg components can be selected from whole eggs, egg whites, dried egg whites, egg yolks, dried egg yolks, edible dried egg products, and/or inedible (for example, produced from inedible and loss eggs) dried egg products. The ratio of dried egg product to egg whites can range from about 1:1 to about 10:1. In meat like chunks that include vegetable protein (for example, pea protein) the ratio of dried egg product to vegetable protein can range from about 1:1 to about 10:1. In meat like chunks that include dried egg product, dried egg white, and vegetable protein the ratio of dried egg product to egg whites to vegetable protein can range from about 1:1:1 to about 10:3:1.

Meat like chunks of the inventive concept can include fat in addition to protein. In such embodiments a meat like chunk protein content can range from about 12% to about 28% and fat content can range from about 18% to about 22%.

In still other embodiments, the composition of the meat like chunk includes meat ingredients and can also include other ingredients that provide advantages such as reduced cost, high protein content, and improved binding characteristics that helps to assure well-formed, aesthetically pleasing meat like chunks. Such other ingredients can include edible egg product, inedible egg product, vegetable (for example, pea) protein, and egg whites. The ratio of meat ingredients to edible egg product can range from about 1.25:1 to about 2.5:1. The ratio of meat ingredients to inedible egg product can range from about 1.5:1 to about 3:1. The ratio of meat ingredients to pea protein can range from about 3:1 to about 9:1. The ratio of meat ingredients to egg white can range from about 2:1 to about 9:1.

It should be appreciated that the meat ingredients of a meat like chunk can be derived from a single species or can be derived from two or more species. For example, a meat ingredient can include one or more of the following: chicken, turkey, poultry, beef, lamb, pork, fish, venison, buffalo, duck, kangaroo, shell fish, crustaceans, fish, chicken meals, chicken by-product meals, chicken meat, lamb meals, lamb meat, turkey meals, turkey meat, beef by-products, viscera, fish meal, entrails, white fish, and/or combinations of these.

Still another embodiment provides a method for producing meat like chunks. In such an embodiment, a method for making a meat like chunk can involve chopping a block of meat using a size reduction device (such as an extractor) and grinding the meat to create a meat slurry. In some embodiments the block of meat so processed is frozen. In other embodiments, such a meat slurry can be generated in a single step process that incorporates both initial size reduction and particle production to produce a meat slurry. In some embodiments, grinding results in meat pieces with a size capable of passing through a hole with diameter of about 12 mm or less, about 10 mm or less, about 8 mm or less, about 6 mm or less, or about 4 mm or less.

A meat emulsion can be produced from such a meat slurry by combining the meat slurry with dry ingredients and mixing with water. The meat emulsion can be transferred (for example, by pumping) into a scraped surface heat exchanger to create a transformed meat emulsion. For example, a meat emulsion can be pumped into a scraped surface heat exchanger under a pressure of at least about 180 psi or between about 200 psi and about 220 psi to produce a transformed meat emulsion. In such an embodiment the transformed meat emulsion exiting the scraped surface heat exchanger can be at least about 100° F. (38° C.), about 110° F. (43° C.), about 120° F. (49° C.), about 130° F. (54° C.), about 140° F. (60° C.), or about 150° F. (66° C.). In some embodiments of the inventive concept a temperature gradient is established along the scraped surface heat exchanger. In preferred embodiments of the inventive process the temperature of the scraped surface heat exchanger is selected to transform the meat emulsion, but not cook the meat emulsion.

In some embodiments of the inventive concept, the meat slurry can be processed through a series (i.e. two or more in succession) of scraped surface heat exchangers. The transformed meat emulsion can, therefore, be further transferred to a second scraped surface heat exchanger to produce a further transformed meat emulsion. In some embodiments, the further transformed meat emulsion is transferred or pumped into a third scraped surface heat exchanger. In some embodiments, such a series of scraped surface heat exchangers can be operated at similar or identical temperatures. In other embodiments of the inventive concept, individual scraped surface heat exchangers can be operated at different temperatures, for example representing a set of increasing processing temperatures, a set of decreasing processing temperatures, or a randomly varied set of processing temperatures.

After being processed in one or more scraped surface heat exchangers (for example, either a second or third scraped surface heat exchanger) a transformed meat emulsion can be cooked, for example by passing it through a steam tunnel, tunnel oven, or similar device to generate a cooked transformed meat emulsion. After such cooking the temperature of the cooked transformed meat emulsion can be at least about 160° F. (71° C.), about 170° F. (77° C.), about 180° F. (82° C.), about 190° F. (88° C.), or about 200° F. (93° C.). The resulting cooked transformed meat emulsion exhibits striations (i.e. linearly arranged regions of density and/or coloration that differ perceptibly from that of the surrounding material) that resemble in appearance and/or texture the striated structure of animal muscle.

The cooked transformed meat emulsion can undergo cutting (for example, in a dicing or sizing device) to be create pieces. The resulting meat like chunks can be of regular, repeated shapes and sizes or can be of random or pseudo-random shapes and sizes. In preferred embodiments of the inventive concept the meat like chunks are of random or pseudo-random shapes and sizes that replicate those of chunks of naturally occurring meat. Such pieces are aesthetically pleasing due to not only their random shapes and sizes but also due to the natural-appearing colors, striations, and/or fibrous textures produced by the previous processes. Such shapes, colors, striations, and/or fibrous textures connote or are characteristic of pieces of natural meat.

Another embodiment of the inventive concept provides a method for making a pet food using such meat like chunks. In some embodiments a wet pet food is produced by adding meat like chunks as described above to various inclusion ingredients and gravy. In other embodiments a dry pet food is produces by combining meat like chunks that have been dried (or example, to less than 12% moisture) with kibbles or with various visible inclusions (such as fruits and vegetables). It should also be noted that systems and methods of the inventive concept could be utilized to produce a meat like chunk that is suitable for human consumption.

As noted above, the meat like chunks of the inventive process have a realistic meat like appearance, in contrast to chunks produced by prior art processes. This is shown in a comparison between FIG. 1 (depicting a meat like chunk of the inventive concept), FIG. 2 (depicting a prior art meat chunk), and FIG. 3 (depicting cooked chicken breast meat of similar size). A typical example of a more realistic meat like appearance in chunks of the inventive concept is shown in FIG. 1. Note that the individual pieces are random in size and shape, appear moist, and have the fibrous and striated appearance of natural meat. The product also exhibit fewer cuts than is seen in the products of prior art processes, which are shown in FIG. 2. As can be seen in the photograph of FIG. 2, chunks produced by a typical prior art process (i.e. a cooked meat emulsion rope or strand chopped into similar size pieces), the majority of the chunks are cut into cube shapes and are similar in size to each other. The pieces lack striations and do not appear fibrous. The impression is artificial, manufactured and un-natural. It is instructive to compare the meat like chunks of the inventive concept shown in FIG. 1 and the prior art chunks of FIG. 2 with natural chicken breast chunks as shown in FIG. 3. It should be appreciated that the improved meat like chunks of the inventive concept, as shown in FIG. 1, compare favorably to actual chicken breast meat pieces that are shown in FIG. 3.

Meat like chunks of the inventive concept have a natural meat like appearance, with striations, fibrous texture, and variations in dimension that cause them to resemble actual meat chunks. In contrast, the conventional meat chunks produced by prior art methods have a uniform and non-striated appearance that does not resemble that of actual meat, as shown in FIG. 2. Chunks of the inventive concept (as shown in FIG. 1) closely resemble the chunks shown in this photograph (FIG. 3), thus providing a more natural, "off the bone" look.

As noted above, meat like chunks of the inventive concept include meat ingredients. Included within the term "meat ingredients" are those meat-derived ingredients defined as "meat" and "meat-by-products" by the current Definitions of Feed Ingredients published by the Association of American Feed Control Officials, Incorporated. Meat ingredients include beef, lamb, veal, chicken, turkey, venison, buffalo, duck, kangaroo, shell fish, crustaceans, fish, chicken meals, chicken by-product meals, chicken meat, lamb meals, lamb meat, turkey meals, turkey meat, beef by-products, viscera, fish meal, entrails, white fish, and the like and combinations thereof. Meat ingredients may comprise from about 25%, about 30%, about 35%, about 40%, about 50%, about 55%, about 60%, or more of the ingredients in a meat like chunk. In some embodiments such meat ingredients can be from about 30% to about 40% of the ingredients in the meat like chunks. In other embodiments such meat ingredients can be from about 40% to about 60% of the ingredients in the meat like chunks. The remainder of such meat like chunks can include starch, egg, vitamins, and the like.

Meat like chunks of the inventive concept can also include binding agents. Contemplated binding agents include wheat flour, wheat gluten, soy protein, lupin protein, corn gluten meal, corn gluten, soybean meal, soy protein isolate, soy protein concentrate, corn protein concentrate, distillers dried grains solubles, pea protein, dry blood plasma, egg whites, dried egg, carrageenan, locust bean gum, guar gum, xanthan gum, un-denatured proteins, food grade polymeric adhesives, gels, starches (including modified starches), gums, and polyols.

Nonlimiting examples of polyols include sugar alcohols such as disaccharides and complex carbohydrates. Certain complex carbohydrates are referred commonly as starches. Disaccharides are molecules having the general formula $CnH_2(n-2)O(n-1)$, wherein the disaccharide has 2 monosaccharide units connected via a glycosidic bond. In such formula, n is an integer equal to or greater than 3. Nonlimiting examples of disaccharides which may be utilized herein include sucrose, maltose, lactitol, maltitol, maltulose, and lactose. Nonlimiting examples of complex carbohydrates include oligosaccharides and polysaccharides. As used herein, the term "oligosaccharide" means a molecule having from three to nine monosaccharide units, wherein the units are covalently connected via glycosidic bonds. As used herein, the term "polysaccharide" means a macromolecule having greater than about nine monosaccharide units, wherein the units are covalently connected via glycosidic bonds. The polysaccharides may be linear chains or branched. The polysaccharide can further include about nine to about 20 monosaccharide units. Polysaccharides can include starches, which are defined herein to include starches and modified starches. Starches (also referred to as a starch component) are generally carbohydrate polymers occurring in certain plant species, for example, cereals and tubers, such as corn, wheat, rice, tapioca, potato, pea, and the like. Starches contain linked alpha-D-glucose units. Starches may have either a mainly linear structure (e.g., amylose) or a branched structure (e.g., amylopectin). Starches may be modified by cross-linking to prevent excessive swelling of the starch granules using methods well-known to those skilled in the art. Additional examples of starches include potato starch, corn starch, and the like. Other examples of commercially available starches include ULTRA SPERSE M™, N-LITE LP™, and TEXTRA PLUS™, all available from National Starch and Chemical Company, Bridgewater, N.J. Nonlimiting examples of complex carbohydrates include raffinose, stachyoses, maltotriose, maltotetraose, glycogen, amylose, amylopectin, polydextrose, and maltodextrin.

Meat like chunks of the inventive concept can include various vitamins, minerals, amino acids, fats and other nutritional and/or aesthetic additives. Non-limiting examples of these ingredients include fructo-oligosaccharides (FOS), inulin, chicory, beet pulp, mannan-oligosaccharides (MOS), oat fiber, citrus pulp, carboxymethylcellulose (CMC), guar gum, gum arabic, apple pomace, citrus fiber, fiber extracts, fiber derivatives, dried beet fiber (sugar removed), celluloses, α-cellulose, galacto-oligosaccharides, xylo-oligosaccharides, oligo derivatives from starch, inulin, psyllium, pectins, citrus pectin, xanthan gum, alginates, gum talha, beta-glucans, chitins, lignin, non-starch polysaccharides, carrageenan, reduced starch, soy oligosaccharides, trehalose, raffinose, stachyose, lactulose, polydextrose, oligodextran, genti-oligosaccharide, pectic oligosaccharide, monosaccharides, disaccharides, hemicellulose, cereals, grains, corn, wheat, rice, oats, corn grits, sorghum, grain sorghum, milo, wheat bran, oat bran, amaranth, durum, semolina, poultry fat, chicken fat, turkey fat, pork fat, lard, tallow, beef fat, vegetable oils, corn oil, soy oil, cottonseed oil, palm oil, palm kernel oil, linseed oil, canola oil, rapeseed oil, fish oil, menhaden oil, anchovy oil, olestra, sodium selenite, monosodium phosphate, calcium carbonate, potassium chloride, ferrous sulfate, zinc oxide, zinc chloride, manganese sulfate, copper sulfate, manganese oxide, potassium iodide, cobalt carbonate, potassium citrate, calcium carbonate, calcium chloride, sodium bisulfate, stannous chloride, stannous fluoride, sodium fluoride, choline chloride, vitamin E supplement, ascorbic acid, vitamin A acetate, calcium pantothenate, pantothenic acid, biotin, thiamine mononitrate (a source of vitamin B1), vitamin B12, niacin, riboflavin supplement (a source of vitamin B2), inositol, pyridoxine hydrochloride (a source of vitamin B6), vitamin D3 supplement, folic acid, vitamin C, beef broth, dried yeast, egg, egg product, flax meal, DL methionine, amino acids, cystine, 1-tryptophan, taurine, carnosine, alanine, cysteine, arginine, methionine, tryptophan, lysine, asparagine, aspartic acid, phenylalanine, valine, threonine, isoleucine, histidine, leucine, glycine, glutamine, tyrosine, homocysteine, ornithine, citruline, glutamic acid, proline, serine, polyphosphates, sodium hexametaphosphate (SHMP), sodium pyrophosphate, sodium tripolyphosphate, copper gluconate, triclosan, glucosamine hydrochloride, chondroitin sulfate, green lipped mussel supplement, blue lipped mussel supplement, methyl sulfonyl methane, boron, boric acid, phytoestrogens, phytoandrogens, genistein, diadzein, L-carnitine, chromium picolinate, chromium tripicolinate, chromium nicotinate, glucose anti-metabolites, 2-deoxy-D-glucose, 5-thio-D-glucose, 3-O-methylglucose, anhydro-sugar alcohols, 1,5-anhydro-D-glucitol, 2,5-anhydro-D-glucitol, 2,5-anhydro-D-mannitol, mannoheptulose, avocado extract comprising mannoheptulose, acid/base modifiers, eucalyptus, lavender, peppermint, tea extract, rosemary extract, rosemarinic acid, coffee extract, caffeic acid, turmeric extract, blueberry extract, grape extract, grape seed extract, soy extract, lutein, astaxanthin, zeaxanthin, bixin, lycopene, beta-carotene, tocopherols (vitamin E), vitamin C, vitamin A, plant-derived materials, carotenoids, selenium, co-enzyme Q10, arachidonic acid, alpha-linoleic acid, gamma linolenic acid, linoleic acid, eicosapentanoic acid (EPA), docosahexanoic acid (DHA), fish oils enriched in omega-3 fatty acids, plasticizers, colorants, odorants, flavorants, sweeteners, buffering agents, slip aids, carriers, pH adjusting agents, natural ingredients, stabilizers, biological additives, enzymes, proteases, lipases, chemical additives, coolants, chelants, denaturants, drug astringents, emulsifiers, analgesics, fragrance compounds, humectants, glycerin, propylene glycol, anti-foaming agents, silicone, preservatives, butylated hydroxytoluene (BHT), butylated hydroxyanisole (BHA), propyl gallate, benzalkonium chloride, EDTA, benzyl alcohol, potassium sorbate, parabens, reducing agents, solvents, hydrotropes, solublizing agents, non-surfactant suspending agents, solvents, aqueous and non-aqueous viscosity increasing agents, sequestrants, keratolytics, natural colorants, synthetic colorants, salts, coloring agents, and the like, can also included in the meat like chunk.

As noted above, meat like chunks of the inventive concept can include colorants or appearance enhancing agents. Non-limiting examples of colorants include, but are not limited to, synthetic or natural colorants, and any combination thereof. A colorant can be malt for brown coloring, titanium dioxide for white coloring, opacifying agents, zinc oxide, caramel, natural colors, artificial colors, tomato extract (e.g. lycopene) for approximately red coloring, alfalfa (e.g. chlorophyll) for approximately green coloring, algal meal for approximately green coloring, caramel for approximately brown coloring, annatto extract (e.g. bixin, transbixin, and norbixin and combinations thereof) for approximately yellow-orange color, dehydrated beets for approximately red-purple coloring, ultramarine blue for approximately blue-green color, β-carotene for approximately orange coloring, tagetes (e.g. lutein) for approximately orange coloring, turmeric for approximately yellow coloring, turmeric oleoresin for approximately yellow coloring, saffron for approximately yellow coloring, corn gluten meal for approximately yellow coloring, paprika for approximately red coloring, paprika oleoresin for approximately orange-red coloring, black iron oxide for approximately black coloring, brown iron oxide for approximately brown coloring, red iron oxide for approximately red coloring, yellow iron oxide for approximately yellow coloring, red cabbage for approximately red-purple coloring, carbon black for approximately black coloring, cochineal extract for approximately red coloring, carrot oil for approximately yellow coloring, FD&C Blue No. 1 (Brilliant Blue) for approximately green-blue coloring, FD&C Blue No. 2 (Indigotine) for approximately deep blue coloring, FD&C Green No. 3 (Fast Green) for about blue-green coloring, FD&C Red No. 3 (Erythrosine) for a approximately bout blue-red coloring, FD&C Red No. 40 (Allura Red) for approximately yellow-red coloring, FD&C Yellow No. 5 (Tartrazine) for approximately lemon-yellow coloring, FD&C Yellow No. 6 (Sunset Yellow) for approximately red-yellow coloring, fruit juice concentrate for inherent coloring (e.g. orange juice concentrate for about orange coloring, etc.), grape color extract for approximately red-blue coloring, xanthophylls (e.g. extracted from broccoli) for approximately green coloring, vegetable juice for inherent coloring (e.g. beet juice for red-purple coloring, etc.), riboflavin for approximately green-yellow coloring, Orange B for approximately orange coloring, and octopus and/or squid ink for approximately black coloring.

Colors as discussed herein can be represented by the Hunter Lab color space. As is well known in the art, the Hunter values are a measure of reflected light and use three parameters: L, a, and b. Generally, "L" denotes the level of white/black, or lightness, and the "a" and "b" values are termed the opponent color axes. The "a" opponent color axis represents, approximately, the redness or greenness (positive or negative, respectively) while the "b" opponent color axis represents the yellowness or blueness (positive or negative, respectively). The color white, for example, can be represented by an "L" value of 100 while the color black can be represented by an "L" value of 0. The color gray can be represented by "L" values between 0 and 100 at a and b values of zero. The color red can be represented by a positive "a" value while the color green can be represented by a negative "a" value. The color yellow can be represented by a positive "b" value while the color blue can be represented by a negative "b" value. All values included and there between for each of the colors associated with the Hunter values are within the scope of the embodiments of this invention and can be represented as red, green, blue, yellow, purple, tan, brown, beige, black, white, gray, orange, pink, lavender, pink and combinations and mixtures thereof based on their particular Hunter Lab values as understood in the art.

A colorant utilized in a meat like chunk of the inventive concept can represent from about 0.01% to about 1% by weight of the product. In other embodiments of the inventive concept a colorant in a chunk can comprise from about 0.015% to about 0.7% by weight of the product, from about 0.1% to about 0.7% by weight of the product, and from about 0.2% to about 0.5% by weight of the product.

In some embodiments, meat like hunks of the inventive concept can be provided along with a gravy component. The gravy component can include water and thickening agents. Examples of suitable thickening agents include chemically and mechanically modified starch(es), gum(s) and mixtures thereof. Suitable chemically modified starches include starches from corn, wheat, rice, potato, tapioca and the like which are modified by acylation, acetylation, cross-linking, and/or the addition of chemical groups such as phosphate, hydroxyalkyl, and hydroxypropyl groups. Examples of suitable gums include carrageenan, xanthan gum, guar gum, locust bean gum, carboxymethylcellulose, and the like. Other ingredients that can be included in a gravy component include soluble carbohydrates such as maltodextrin, sucrose and corn syrup, as well as also salts, colors, flavors and emulsifiers such as lecithin. In some embodiments of the inventive concept production of a gravy component can include a cooking step, which can enhance the flavor of the gravy component (particularly if a non-thermal sterilization process is used). Such a thermal treatment can, in some embodiments, be used to provide the same degree of microbiological kill as is present with non-thermal final sterilization.

In some embodiments of the inventive concept, meat like chunks can be provided along with edible, visible inclusions. Various non-limiting examples of edible, visible inclusions include tomatoes, apples, avocados, pears, peaches, cherries, apricots, plums, grapes, oranges, grapefruit, lemons, limes, cranberries, raspberries, blueberries, watermelon, cantaloupe, muskmelon, honeydew melon, strawberries, banana, sweet potatoes, carrots, peas, lentils, peppers, green peppers, red peppers and combinations thereof.

A complete wet pet food of the inventive concept can be formed by combining meat like chunks, visible inclusions and gravy. Such a complete wet pet food can be "complete and balanced" as defined by the AAFCO to meet the maintenance and/or growth nutritional requirements of a dog or a cat. Alternatively, a complete wet pet food of the inventive concept can not meet such AAFCO nutrient requirements.

It should be appreciated that a number of significant technical and commercial challenges exist in the production of improved meat like chunks. Ingredient costs present challenges in creating an affordable meat like chunk. In addition, not only must a meat like chunk have to correct appearance and texture, it should be recognized that it generally provides an important (often primary) source of protein in a food product into which it is incorporated. Non-meat ingredients incorporated into meat like chunks of the inventive concept can be selected to provide nutrition and/or to facilitate the production of suitable appearance and texture. Following are suitable non-meat ingredients that can be included in a meat like chunk and a brief explanation of why they might be included. An edible egg product serve as a source of protein and can provide a well formed meat like chunk, however such an edible egg product ingredient can be prohibitively expensive. Egg whites have been identified as providing functional binding properties that help to keep a meat like chunk intact while avoiding excessive costs from the use of edible eggs. The inventors have found that pea protein provides functionality for forming the meat like chunk, and also provides a desirable high protein content at low cost (relative to proteins derived from eggs). Inedible egg product provides some functionality in forming meat like chunks, and its low cost and relative abundance make it a desirable protein source that can be incorporated into meat like chunks (provided they do note lose their ability to be formed).

The ratio of meat ingredients to edible dried egg product in meat like chunks of the inventive concept can vary. In various embodiments the ratio of meat ingredients to edible dried egg product in the meat like chunks can range from about 1:1 to about 1.5:1, about 1.25:1 to about 2:1, about 2:1 to about 2.5:1, and/or about 2.5:1 to about 3.5:1. In other embodiments the ratio of meat to edible dried egg product in the meat like chunks can be about 1.25:1 to about 2.5:1.

Similarly, the ratio of meat ingredients to inedible dried egg product in meat like chunks of the inventive concept can vary. In various embodiments the ratio of meat ingredients to inedible dried egg product in the meat like chunks can be from about 1:1 to about 1.5:1, about 1.5:1 to about 2:1, about 2:1 to about 2.5:1, and/or about 2.5:1 to about 3.5:1. In other embodiments the ratio of meat to inedible dried egg product in meat like chunks can be about 1.5:1 to about 3:1.

The ratio of meat ingredients to pea protein in meat like chunks of the inventive concept can also vary. In various embodiments the ratio of meat ingredients to pea protein in the meat like chunks can be from about 3:1 to about 5:1, about 5:1 to about 7:1, about 7:1 to about 9:1, and/or about 9:1 to about 11:1. In other embodiments the ratio of meat to pea protein in the meat like chunks can be about 3:1 to about 9:1.

Similarly, the ratio of meat ingredients to egg white in meat like chunks of the inventive concept can vary. In various embodiments the ratio of meat ingredients to egg white in the meat like chunks can be from about 2:1 to about 4:1, about 4:1 to about 6:1, about 6:1 to about 8:1, and/or about 8:1 to about 9:1. In other embodiments the ratio of meat to egg white in the meat like chunks can be about 2:1 to about 9:1.

The ratio of dried egg product to egg whites in meat like chunks of the inventive concept can vary. In varying embodiments the ratio of dried egg product to egg whites can be from about 1:1 to about 10:1, about 1:1 to about 3:1, about 3:1 to about 6:1, and/or about 6:1 to about 10:1. In other embodiments the ratio of dried egg product to egg whites can be about 1:1 to about 3:1, about 3:1 to about 6:1.

The ratio of dried egg product to pea protein in meat like chunks of the inventive concept can vary. In varying embodiments the ratio of dried egg product to pea protein can be from about 1:1 to about 3:1, about 3:1 to about 5:1, about 5:1 to about 7:1, and/or about 7:1 to about 10:1. In other embodiments the ratio of dried egg product to pea protein can be about 3:1 to about 5:1, about 5:1 to about 7:1.

The ratio of dried egg product to egg whites to pea protein in meat like chunks of the inventive concept can vary. In varying embodiments the ratio of dried egg product to egg whites to pea protein can be from about 1:1:1 to about 10:3:1, about 1:1:1 to about 3:3:1, about 3:1:1 to about 6:3:1, and/or about 6:1:1 to about 10:3:1. In other embodiments the ratio of dried egg product to egg whites to pea protein can be about 1:1:1 to about 3:3:1, about 3:1:1 to about 6:3:1.

As noted above, processes of the inventive concept can include the application of heat. Heating various mixtures of meats and other ingredients can cause the mixtures to transform in an irreversible manner. This transformation process is useful as it causes the mixture to bind together and create a new form rather than simply remaining a mixture of discrete ingredients. The heating process is further useful to create the striated/fibrous appearance of the meat chunks and to create an aesthetically pleasing product such as the production of attractive aromas and visual changes that cause such a transformed mixture look more like an actual meat chunk. Heating can be achieved by a variety of means.

Heating of ingredient mixtures can be by direct means such as is the case when the heat is applied directly to the ingredient mixtures. Examples of this in food are grilling, frying, and roasting. Alternatively, in some embodiment ingredient mixtures can be heated indirectly. Heating of ingredient mixtures by indirect means involves a transfer medium between the heat source and the ingredient mixture. Examples of such indirect heating occur in devices such as double boilers and scraped surface heat exchangers. Scraped surface heat exchangers have the advantage of moving the ingredient mixture constantly through a pipe or similar hollow cylinder that is arranged such that heat is applied to its external surface. This can be accomplished by encasing the pipe or cylinder in a water bath that can be maintained at a desired (for example, elevated) temperature. The temperature difference between the interior and exterior of the scraped surface heat exchanger is what causes the ingredient mixture to be heated through indirect heating. While generally regarded as two discrete phenomena, it is not unusual for both direct and indirect heating to occur in the same process. An example of this occurs during grilling of meat where application of a flame will directly transform the surface of the meat while the meat on the interior is indirectly heated through conduction of heat from the surface. Another example of direct heating associated with indirect heating occurs when significant pressure is used to force an ingredient mixture through a heat exchanger pipe (for example, of a scraped surface heat exchanger), where the resulting friction results in direct heating of the ingredient mixture along with indirect heating of the ingredient mixture.

A nonlimiting example of a process for making meat like chunks of the inventive concept is depicted in FIG. 4. Frozen meat 405 is added to an extructor 410 for the purpose of chopping, crushing and an initial grinding up of the meat blocks. The frozen chunks of meat are then added to a grinder 415 that creates a ground meat slurry. A ground meat slurry contains pieces that will pass through a hole with a characteristic diameter. In various embodiments, the maximum diameter of the hole is about 2 mm, about 3 mm, about 4 mm, about 5 mm, about 6 mm, about 7 mm, about 8 mm, about 9 mm, and/or about 10 mm. In other embodiments, the maximum diameter of the hole is about 6 mm, about 7 mm, and/or about 8 mm. The resulting ground meat slurry is transferred to a mixer 435. Water 420, dry ingredients 425 and liquid ingredients 430 are added the mixer 435 to mix with the ground meat slurry. The mixture of water, dry ingredients, liquid ingredients and meat is now in the form of a meat slurry mixture.

The meat slurry mixture (MSM) is moved to a transporter 440 (for example a bin) and supplied to a pump 445. The pump 445 then pumps the MSM into a first scraped surface heat exchanger (SSHE) 450 under pressure. Such an SSHE allows a product to be heated or cooled in an efficient and consistent manner. Suppliers of suitable SSHEs include Waukesha Cherry Burrell® and/r APV® brands from SPX Corporation, United Kingdom, APV Crepaco, USA, and Alfa Laval, Sweden. One embodiment of the SSHE includes a Waukesha Cherry Burrell, Votator model VII®. The meat slurry mixture upon entering the SSHE can have a temperature of about 40° F. (4.4° C.). The meat slurry mixture can be pumped into the SSHE 450 at about 180 psi to about 250 psi and heated as it passes through the SSHE by supplying a heat jacket of the SSHE with steam (for example, at about 20 psi). It should be appreciated that the pressure needed to push the meat slurry mixture through the SSHE can generate additional heat, and can be critical to successfully obtaining the desired meat like chunks. In various embodiments, the pressure through the SSHE is about 180 psi and about 200 psi, about 200 psi and about 220 psi, about 220 psi, about 240 psi, about 240 psi, and/or about 250 psi. In other embodiments, the pressure through the SSHE is about 200 psi and about 220 psi, about 220 psi, and/or about 240 psi.

Upon exiting the first SSHE 450 the meat slurry mixture can be at a temperature of about 130° F. (54° C.) to about 160° F. (71° C.). The MSM at about 130° F. (54° C.) to about 160° F. (71° C.) is then transferred to a second SSHE 455. Again, the MSM is pushed and heated within the second SSHE 455. Upon exiting the second SSHE 455 the MSM can be about 140° F. (60° C.) to about 185° F. (85° C.). The MSM at about 140° F. (60° C.) to about 185° F. (85° C.) is then transferred to a third SSHE 460. The MSM is pushed through the third SSHE 460 and can be simultaneously heated with steam (for example, at about 80 psi) in the surrounding heat jacket of the third SSHE 460. Upon exiting the third SSHE 460 the MSM can be about 125° F. (52° C.) to about 185° F. (85° C.). At this point in the process the MSM can now be, essentially, a completely processed meat like chunk in nature. In some embodiments of the inventive concept, passage through the SSHEs has cooked or partially cooked some or all of the product.

To improve the consistency of processing, cooking can be completed by passed through a steam tunnel 465. The product enters the steam tunnel at about 125° F. (52° C.) to about 185° F. (85° C.) and resides within the steam tunnel for a sufficient time (for example, 2.5 minutes to about 5 minutes) to cook the product. The cooked product leaves the steam tunnel at about 180° F. (82° C.) to about 200° F. (93° C.).

When cooking is complete the cooked product can be transferred to a dicer 470. Upon exiting the dicer 470 the diced product includes meat like chunks of irregular, random or essentially random shapes, and can be at a temperature of about 120° F. (49° C.) to about 150° F. (66° C.). Optionally, the product can be transferred to an inspection station 475 for visual inspection and excessively burnt pieces removed. Such visual inspection can be manual or automated (for example, using a digital camera and suitable image recognition software). The meat like chunks 480 formed by such a process are typically between about 13 mm and about 20 mm in length along the longest dimension. The pieces have a nutrient composition of such meat like chunks is between about 45% and about 55% moisture, about 18% to about 30% protein, about 8% to about 20% fat, and about 1% to about 8% ash.

It should be appreciated that while FIG. 4 shows the use of three scraped heat exchangers in the production of meat like chunks of the inventive concept, that suitable meat like chunks can be prepared using 1, 2, 3, 4, or more scraped heat exchangers. In some embodiments of the inventive concept the steam tunnel or similar non-mixing oven can be excluded, with one or more scraped heat exchangers providing sufficient cooking and processing to produce a striated, fibrous meat like chunk of the inventive concept.

Chunks of the inventive concept can be used in several different applications. Non-limiting example of uses of these randomly made pieces include adding the pieces into a complete wet pet food, drying the pieces about 12% or less moisture and adding them to dry kibbled food, drying the pieces to about 12% or less moisture and adding various visual inclusions (such as dried plant materials) with them, and drying the pieces to about 12% or less moisture and adding dry kibbled food and various visual inclusions with them.

The size of meat like chunk pieces can be varied based on the type of product they are used in. For example, since cats typically prefer smaller pieces than dogs, meat like chunks for cats can be produced in smaller sizes. The pieces are characterized as having one dimension that constitutes the maximum length of the piece. The remaining dimensions of the piece are characterized as being shorter in length and are referred to as secondary dimensions of the piece. In varying embodiments, the maximum length of the piece is about 1 cm to about 1.5 cm, about 1.5 cm to about 2 cm, about 2 cm to about 2.5 cm, about 2.5 cm to about 3 cm, about 3 cm to about 3.5 cm. In other embodiments the maximum length is about 1 cm to about 1.5 cm, about 1.5 cm to about 2 cm, about 2 cm to about 2.5 cm. In varying embodiments, a secondary length of the piece is about 0.01 cm to about 0.25 cm, about 0.25 cm to about 0.5 cm, about 0.5 cm to about 0.75 cm, about 0.75 cm to about 1 cm, about 1 cm to about 1.5 cm. In other embodiments a secondary dimension length is about 0.25 cm to about 0.5 cm, about 0.5 cm to about 0.75 cm.

The meat like chunk pieces can be characterized using a ratio of maximum dimension length to a first secondary dimension to a second secondary dimension. The first secondary dimension is perpendicular to the maximum dimension length. The second secondary dimension is perpendicular to the first secondary dimension. In varying embodiments, the maximum dimension length to a first secondary dimension to a second secondary dimension is from about 1.0:1.0:1.0 to about 1.25:1.0:1.0, about 1.25:1.0:1.0 to about 1.5:1.0:1.0, about 1.5:1.0:1.0 to about 1.75:1.0:1.0, about 1.75:1.0:1.0 to about 2.0:1.0:1.0, about 2.0:1.0:1.0 to about 2.25:1.0:1.0, about 2.25:1.0:1.0 to about 2.5:1.0:1.0, about 2.5:1.0:1.0 to about 2.75:1.0:1.0, about 2.5:1.25:1.0 to about 2.75:1.25:1.0, about 2.5:1.5:1.0 to about 2.75:1.5:1.0, about 2.75:1.0:1.0 to about 3.0:1.0:1.0, about 2.75:1.25:1.0 to about 3.0:1.25:1.0, about 2.75:1.5:1.0 to about 3.0:1.5:1.0, about 3.0:1.0:1.0 to about 3.25:1.0:1.0, about 3.0:1.25:1.0 to about 3.25:1.25:1.0, about 3.0:1.5:1.0 to about 3.25:1.5:1.0, about 3.25:1.0:1.0 to about 3.5:1.0:1.0. In other embodiments the maximum dimension length to a first secondary dimension to a second secondary dimension is from about 2.0:1.0:1.0 to about 2.25:1.0:1.0, about 2.25:1.0:1.0 to about 2.5:1.0:1.0, about 2.5:1.0:1.0 to about 2.75:1.0:1.0, about 2.5:1.25:1.0 to about 2.75:1.25:1.0, about 2.75:1.0:1.0 to about 3.0:1.0:1.0, about 2.75:1.25:1.0 to about 3.0:1.25:1.0.

An embodiment of a process of the inventive concept for incorporating the chunks into a wet pet food is depicted schematically in FIG. 5. In this exemplary process, meat like chunk pieces 505 along with visible inclusions 510 are placed in a blender/mixer 515. The product is elevated up to a dispensing unit 520. The required amount of product is then dispensed into racked individual containers 525. Gravy 530 is added to the pieces in the container. The filled containers are then transferred to a lidding device 535 and sealed under a modified atmosphere (for example nitrogen and carbon dioxide). The containers with sealed lidding are then transferred to a retort 540. Typical conditions in such a retort 540 are about 30 psi pressure and a temperature of about 251° F. (121.7° C.). Sealed containers are held in the retort for about 70 minutes to about 79 minutes. The containers are then cooled to a temperature below 110° F. (43° C.) before exiting the retort. After the containers reach ambient temperature (about 70° F. (21° C.) to about 90° F. (32° C.)), they are passed through a labeling device 545 and an overcapping device 550 to apply labels and overcaps, respectively, to the filled and sealed containers. The containers are then transferred to a packing station 555 where they are packed into cases for distribution.

In certain embodiments, the wet pet food of the various embodiments described herein includes food having from about 35% to about 65% by weight of meat like chunks, from about 17.5% to about 32.5% by weight of gravy, and from about 17.5% to about 32.5% by weight of visible inclusions. Other embodiments of a wet pet food can include from about 40% to about 65% by weight of meat like chunks, from about 17.5% to about 30% by weight of gravy, and from about 17.5% to about 30% by weight of visible inclusions. Still further embodiments of the wet pet food can include from about 45% to about 55% by weight of meat like chunks, from about 22.5% to about 27.5% by weight of gravy, and from about 22.5% to about 27.5% by weight of visible inclusions.

Figure 6:
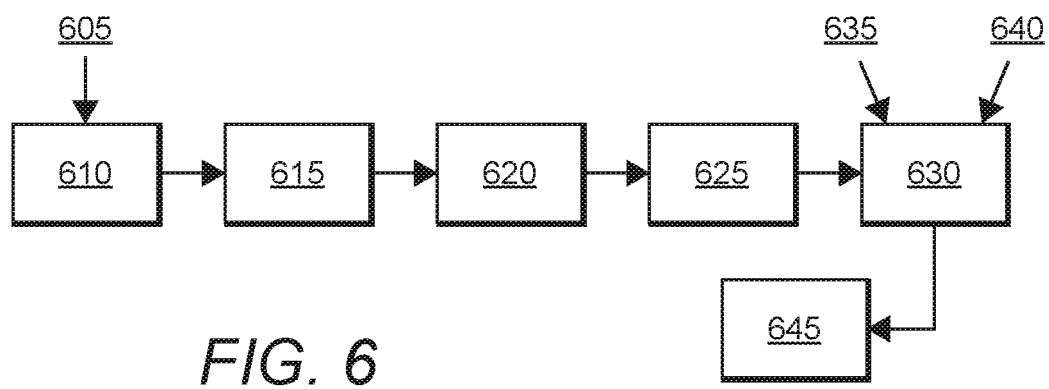
FIG. 6 schematically depicts an exemplary process for producing a dry pet food utilizing meat like chunks of the inventive concept.

Another embodiment is a process of the inventive concept for incorporating meat like chunks into a dry kibbled food, an example of which is depicted schematically in FIG. 6. In this exemplary process, meat like chunk pieces are produced as noted above. The pieces 605 are then conveyed by a bulk conveyor 610, such as a conveyor belt, that extends through a dryer 615. Dryers suitable for this purpose are available through Buhler Aeroglide, Cary N.C. The speed of the conveyor 610 is controlled so that a desired moisture level within the treated meat like chunks is obtained. More specifically, the desired moisture level, which is generally about 5% to about 12% for dry pet food, is achieved by selecting an internal temperature for dryer 615 and then controlling the dwell time of the meat like chunks in dryer 615 by adjusting the speed of the conveyor. Generally, such a drying step renders the product less susceptible to spoilage relative to a product left with at a higher moisture level required for extrusion.

After the drying, the dried meat like chunks are transferred by a second bulk conveyor 620 to cooler 625 to reduce the product's temperature. In some embodiments the cooler 625 can be in the form of an enclosure coupled to or at least partially surrounding dryer 615. During the dwell time within cooler 625, the dried meat like chunks are cooled to a temperature between about ambient temperature and about 120° F. (49° C.), for example by air flow provided by fans of the cooler 625. In one embodiment, the pieces are cooled to about 100° F. (38° C.). Generally, such a cooling step is included before mixing with other dry products (such as kibbles) to prevent condensation within the mixture. Such condensation can form wet areas in the mixture and increases the chances of product spoilage. Dry products suitable for use with a dry pet food of the inventive concept include kibble (for example dog kibble or cat kibble) pet food products, and dried plant products such as dried fruits (for example, dried apples, dried bananas, etc.) and dried vegetables (for example, dried beans, dried lentils, dried green beans, etc.). A photograph of typical dried, cooled meat like chunk pieces is shown in FIG. 7. Such dried pieces can be combined with other dry ingredients such as dry kibbles 635 and/or visible inclusions 640, in a mixer 630 to produce a dry pet food mixture. This dry pet food mixer is then transferred to a packing area 645 for packaging.

In certain embodiments, the dry pet food mixture of the various embodiments described herein includes from 0.1% to 90% by weight of dried meat like chunks and includes from 10% to 99.9% by weight of kibbles. Other embodiments of the dry pet food mixture can include from 0.1% to 20% by weight of dried meat like chunks and include from 80% to 99.9% by weight of kibbles. Still further embodiments of the dry pet food mixture may comprise from 0.1% to 5% by weight of dried meat like chunks and comprising from 95% to 99.9% by weight of kibbles.

Figure 8:
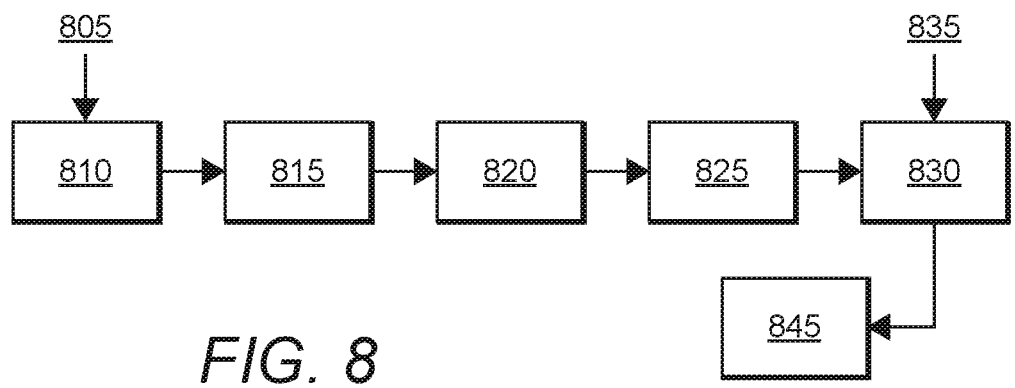
FIG. 8 schematically depicts an alternative exemplary process for producing a dry pet food utilizing meat like chunks of the inventive concept

An example of an alternative embodiment of a process of the inventive concept for providing the dried meat like chunk pieces along with visible inclusions is depicted schematically in FIG. 8. In the exemplary process depicted in FIG. 8, meat like chunk pieces 805 are produced as noted above. The pieces 805 are then conveyed by a bulk conveyor 810, such as a conveyor belt, that extends through a dryer 815. Dryers suitable for this purpose are available through Buhler Aeroglide, Cary N.C. The speed of the conveyor 810 is controlled so that a desired moisture level within the treated meat like chunks is obtained. More specifically, the desired moisture level, which is generally about 5% to about 12% for dry pet food, is achieved by selecting an internal temperature for dryer 615 and then controlling the dwell time of the meat like chunks in dryer 815 by adjusting the speed of the conveyor. Generally, such a drying step renders the product less susceptible to spoilage relative to a product left with at a higher moisture level required for extrusion.

After the drying, the dried meat like chunks are transferred by a second bulk conveyor 820 to cooler 825 to reduce the product's temperature. In some embodiments the cooler 825 can be in the form of an enclosure coupled to or at least partially surrounding dryer 815. During the dwell time within cooler 825, the dried meat like chunks are cooled to a temperature between about ambient temperature and about 120° F. (49° C.), for example by air flow provided by fans of the cooler 625. In one embodiment, the pieces are cooled to about 100° F. (38° C.). Generally, such a cooling step is included before mixing with other dry products (such as visible inclusions) to prevent condensation within the mixture. Such condensation can form wet areas in the mixture and increases the chances of product spoilage. Such dried pieces can be combined with other dry ingredients, such as visible inclusions 835, in a mixer 830 to produce a dry pet food mixture. This dry pet food mixer is then transferred to a packing area 845 for packaging.

In certain embodiments, the dried meat like chunk pieces along with visible inclusions of the various embodiments described herein include dry pet food including from 35% to 95% by weight of dried meat like chunks and comprising from 5% to 65% by weight of visible inclusions. In other embodiments of the dry pet food the dried meat like chunk pieces along with visible inclusions can include from 50% to 90% by weight of dried meat like chunks and from 10% to 50% by weight of visible inclusions. Still further embodiments of the dry pet food mixture can include from 60% to 80% by weight of dried meat like chunks and from 20% to 40% by weight of visible inclusions.

EXAMPLES

Example 1

Description of Chunk Process and Chicken Based Chunks Formulation

In this example, one embodiment of the meat like chunk is produced using two scraped surface heat exchangers (SSHE). The composition of the meat like chunks is set forth in Table 1. Chunks are produced from the ingredients in Table 1 by the following process. 410 kg of chicken ingredient in the form of frozen meat blocks are added to an extructor and chopped and then ground sufficiently to create a frozen paste-like meat slurry to pass through a die plate containing 6.35 mm diameter holes. The paste-like meat slurry is then combined with additional dry ingredients in a mixer tub where it is mixed and emulsified into a meat emulsion (ME). The ME is pumped at 200 psi into a first scraped surface heat exchanger (SSHE). The ME is heated in the SSHE and exits the first SSHE as a transformed meat emulsion (TME) at 145° F. (63° C.) after about 4 minutes to about 5 minutes of residence time. The TME is pumped into a second SSHE and is heated in the SSHE and exits the second SSHE as a further transformed meat emulsion (FTME) at 165° F. (74° C.) after about 4 minutes to about 5 minutes of residence time. Upon leaving the second SSHE the FTME is placed on a conveyor that transports the ME through a steam tunnel. The FTME is retained within the steam tunnel for about 3 to about 5 minutes. Upon leaving the steam tunnel the FTME product is about 180° F. (82° C.) to about 200° F. (93° C.). The FTME product is then passed through a dicer to reduce the size of the pieces to less than 13 mm×20 mm. The resulting pieces are visually inspected to remove any blackened or excessively dark pieces. This mixture of pieces have a suitable appearance of meat like chunks given the fibrous like appearance of meat and the size of the pieces being acceptable.

TABLE 1

Chicken Based Meat like Chunk Composition

| Ingredient | Ingredient Type | Percent by Weight |
|---|---|---|
| Chicken | Meat | 39 |
| Edible Dried Egg Product | Dry | 31 |
| Micro-ingredients* | Dry | 1.5 |
| Pea protein | Dry | 5 |
| Natural Flavor | Dry | 1.5 |
| Tapioca Starch | Dry | 1.0 |
| Natural Color | Liquid | 0.01 |
| Water | Liquid | 20.99 |

*Micro-ingredients include: tricalcium phosphate, potassium chloride, choline chloride, zinc proteinate, vitamin E supplement, iron proteinate, taurine, vitamin B12 supplement, vitamin A acetate, copper proteinate, manganese proteinate, niacin, calcium proteinate, thiamine mononitrate, biotin, riboflavin, pyridoxine hydrochloride, sodium selenite, vitamin D3 supplement, calcium iodate, and folic acid.

Example 2

Description of Chunk Process and Beef Based Chunks Formulation

In this example, one embodiment of the meat like chunk is produced using three scraped surface heat exchangers (SSHE). The composition of the meat like chunks is set forth in Table 2. Chunks are produced from the ingredients in Table 2 by a process similar to that described in Example 1 except that a third SSHE is utilized. The third SSHE is used to further cook the pieces and produces an appearance that is more like the fibrous structure of real meat pieces. After exiting the second SSHE, the FTME is pumped into a third SSHE where it is allowed to cool and exits the third SSHE at 130° F. (54° C.) after about 4 minutes to about 5 minutes of residence time. Upon leaving the third SSHE the FTME is then placed on a conveyor that transports the FTME through a steam tunnel and continues in the process as noted in Example 1.

TABLE 2

Beef Based Meat like Chunk Composition

| Ingredient | Ingredient Type | Percent by Weight |
|---|---|---|
| Beef | Meat | 24 |
| Chicken | Meat | 12 |
| Edible Dried Egg Product | Dry | 31 |
| Micro-ingredients* | Dry | 1.5 |
| Pea protein | Dry | 5 |
| Natural Flavor | Dry | 1.5 |
| Tapioca Starch | Dry | 1.0 |
| Natural Color | Liquid | 0.01 |
| Water | Liquid | 23.99 |

*Micro-ingredients include: tricalcium phosphate, potassium chloride, choline chloride, zinc proteinate, vitamin E supplement, iron proteinate, taurine, vitamin B12 supplement, vitamin A acetate, copper proteinate, manganese proteinate, niacin, calcium proteinate, thiamine mononitrate, biotin, riboflavin, pyridoxine hydrochloride, sodium selenite, vitamin D3 supplement, calcium iodate, and folic acid.

Example 3

Production of Wet Complete Pet Food with Gravy and Visible Inclusions

The meat like chunks produced as described in Example 1 were used to make a complete wet pet food product. After visual inspection is completed, the meat like chunks are transported to an elevated conveyor belt that adds the chunks into a dispensing unit. The dispensing unit adds 108 g of chunks to each container. 19 g of visible inclusions (carrots, peas, broccoli in equal proportions by weight) are then added to the container. An additional 156 g of gravy is added each container. The container is then sealed with a lid made of polyurethane. The sealed containers are then placed into a rack. The rack with sealed containers is then placed into a retort. The product is retorted for 77 minutes at 251° F. (122° C.) at up to 30 psi of over-pressure. The containers are cooled to below 110° F. (43° C.) while still in the retort. After cooling, a replaceable overcap is placed on each container. The containers are then placed in case packs (12 containers/pack).

Example 4

Drying of Meat Like Chunks

The meat like chunks as described in Example 1 were dried down to assure shelf-stability without the use of a barrier package. After chunks are made as in Example 1, they are dried in a Wenger® dryer unit which is fitted with a multi-pass dryer and cooler. Total retention time of the chunks in the dryer is 31 minutes. The chunks enter the dryer at 52% moisture and leave the dryer at about 9% to about 12% moisture.

Example 5

Inclusion of Dry Chunks in Kibbled Food

The dried meat like chunks produced as described in Example 4 were combined with kibble to make a kibbled food with real meat like chunks. The dried meat like chunks are produced using the formula noted in Table 3.

TABLE 3

Meat like Chunks and Kibble Composition

| Ingredient | Percent by Weight |
|---|---|
| Meat like Chunks | 1 |
| Kibbles* | 99 |

*The kibbles were obtained from Iams MiniChunks ®, The Iams Company, Cincinnati, OH.

Example 6

Production of Dry Meat Like Chunks as Complete & Balanced Food

The dried meat like chunks produced as described in Example 4 were combined with dried green beans, dried carrots, dried apples and dried bananas to make a stew-like dried food format. The dried fruit and dried vegetables were obtained from a local grocery store (Wegmans®). Dried meat like chunks and fruits and vegetables are combined in the formula as noted in Table 4.

TABLE 4

Meat like Chunk, Fruits and Vegetables Composition

| Ingredient | Percent by Weight |
|---|---|
| Meat like Chunks (dried) | 90.0 |
| Green beans (dried) | 2.5 |
| Carrots (dried) | 2.5 |

TABLE 4-continued

Meat like Chunk, Fruits and Vegetables Composition

| Ingredient | Percent by Weight |
|---|---|
| Apples (dried) | 2.5 |
| Bananas (dried) | 2.5 |

Example 7

Alternative Chicken-Based Chunk Formulations

In this example, three non-limiting embodiments of the meat like chunk based on chicken are produced using: 1) a ratio of 31:5:1 edible dried egg product to pea protein to tapioca starch, 2) a ratio of 26:5:5:1 edible dried egg product to egg whites to pea protein to tapioca starch or 3) a ratio of 15.5:15.5:5:1 of edible dried egg product to inedible dried egg product to pea protein to tapioca starch as set forth in Table 5. The egg whites based formula embodiment reduces the use of edible dried egg product, which is substantially more costly. The inedible egg based formula embodiment also reduces the use of edible dried egg product, which again is substantially more costly. The products are produced using three scraped surface heat exchangers (SSHE) and a steam tunnel, as depicted in FIG. 4. Chunks are produced from the ingredients in Table 5 by the processing method as described in Example 2. Suitable meat like chunks result from using any of the three formula embodiments.

TABLE 5

Chicken-Based Meat like Chunks with Alternative Egg Ingredients

| Ingredient | Ingredient Type | Edible Egg Formula (Percent by Weight) | Egg White Based Formula (Percent by Weight) | Inedible Egg Formula (Percent by Weight) |
|---|---|---|---|---|
| Chicken | Meat | 39 | 39 | 39 |
| Edible Dried Egg Product | Dry | 31 | 26 | 15.5 |
| Inedible Dried Egg Product | Dry | 0 | 0 | 15.5 |
| Egg whites | Dry | 0 | 5 | 0 |
| Micro-ingredients* | Dry | 1.5 | 1.5 | 1.5 |
| Pea protein | Dry | 5 | 5 | 5 |
| Natural Flavor | Dry | 1.5 | 1.5 | 1.5 |
| Tapioca Starch | Dry | 1.0 | 1.0 | 1.0 |
| Natural Color | Liquid | 0.01 | 0.01 | 0.01 |
| Water | Liquid | 20.99 | 20.99 | 20.99 |

*Micro-ingredients include: tricalcium phosphate, potassium chloride, choline chloride, zinc proteinate, vitamin E supplement, iron proteinate, taurine, vitamin B12 supplement, vitamin A acetate, copper proteinate, manganese proteinate, niacin, calcium proteinate, thiamine mononitrate, biotin, riboflavin, pyridoxine hydrochloride, sodium selenite, vitamin D3 supplement, calcium iodate, and folic acid.

Example 8

Alternative Beef-Based Chunk Formulations

In this example, three non-limiting embodiments of the meat like chunk based on beef are produced using: 1) a ratio of 29:6:1 edible dried egg product to pea protein to tapioca starch, 2) a ratio of 20:9:6:1 edible dried egg product to egg whites to pea protein to tapioca starch or 3) a ratio of 14.5:14.5:6:1 of edible dried egg product to inedible dried egg product to pea protein to tapioca starch as set forth in Table 6. The egg whites based formula embodiment reduces the use of edible dried egg product, which is substantially more costly. The inedible egg based formula embodiment also reduces the use of edible dried egg product, which again is substantially more costly. The products are produced using three scraped surface heat exchangers (SSHE) and a steam tunnel. Chunks are produced from the ingredients in Table 6 by the processing method as described in Example 2. Suitable meat like chunks result from using any of the three formula embodiments.

TABLE 6

Beef-Based Meat like Chunk with Egg Whites

| Ingredient | Ingredient Type | Edible Egg Formula (Percent by Weight) | Egg White Based Formula (Percent by Weight) Percent by Weight | Inedible Egg Formula (Percent by Weight) Percent by Weight |
|---|---|---|---|---|
| Beef | Meat | 24 | 24 | 24 |
| Chicken | Meat | 12 | 12 | 12 |
| Edible Dried Egg Product | Dry | 29 | 20 | 14.5 |
| Inedible Dried Egg Product | Dry | 0 | 0 | 14.5 |
| Egg whites | Dry | 0 | 9 | 0 |
| Micro-ingredients* | Dry | 1.5 | 1.5 | 1.5 |
| Pea protein | Dry | 6 | 6 | 6 |
| Natural Flavor | Dry | 0.3 | 0.3 | 0.3 |
| Tapioca Starch | Dry | 1.0 | 1.0 | 1.0 |
| Natural Color | Liquid | 0.05 | 0.05 | 0.05 |
| Water | Liquid | 26.15 | 26.15 | 26.15 |

*Micro-ingredients include: tricalcium phosphate, potassium chloride, choline chloride, zinc proteinate, vitamin E supplement, iron proteinate, taurine, vitamin B12 supplement, vitamin A acetate, copper proteinate, manganese proteinate, niacin, calcium proteinate, thiamine mononitrate, biotin, riboflavin, pyridoxine hydrochloride, sodium selenite, vitamin D3 supplement, calcium iodate, and folic acid.

Example 9

Analysis of Required Nutrients in Chicken and Beef Based Meat Like Chunks

In this example, an embodiment of the chicken based meat like chunk was produced and nutrients were analyzed as set forth in Table 7. In this example, an embodiment of the beef based meat like chunk was produced and nutrients were analyzed as set forth in Table 8. In the case of both chicken based and beef based meat like chunks, all nutrients were at levels that met AAFCO maintenance requirements for dogs.

TABLE 7

Analysis of Required Nutrients in Chicken-Based Meat like Chunks

| Nutrient | Level, % |
|---|---|
| Moisture | 53 |
| Protein | 24 |
| Fat | 14 |
| Ash | 4.1 |
| Crude fiber | 0.8 |
| Nitrogen Free Extract | 4.1 |

TABLE 8

Analysis of Required Nutrients in Beef-Based Meat like Chunks

| Nutrient | Level, % |
|---|---|
| Moisture | 50 |
| Protein | 26 |

TABLE 8-continued

Analysis of Required Nutrients in Beef-Based Meat like Chunks

| Nutrient | Level, % |
|---|---|
| Fat | 14 |
| Ash | 4.3 |
| Crude fiber | 1.4 |
| Nitrogen Free Extract | 4.3 |

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for producing a meat like product, comprising:
    fragmenting a block of frozen meat obtained from animal skeletal muscle to produce a plurality of meat fragments;
    blending the plurality of meat fragments with a binding agent to form a meat slurry;
    transforming by heat treating but not cooking the meat slurry using a first scraped heat exchanger at a pressure of at least 180 psi to produce a first transformed meat emulsion that is not cooked;
    transferring the first transformed meat emulsion to a second scraped heat exchanger;
    transforming by heat treating but not cooking the first transformed meat emulsion using the second scraped heat exchanger to produce a second transformed meat emulsion, wherein the transforming steps include heating to one or more transforming temperatures that are less than a cooking temperature of at least 160 degrees Fahrenheit at which the meat emulsion is cooked;
    transferring the second transformed meat emulsion from the second scraped heat exchanger; and
    cooking by heating the second transformed meat emulsion to at least the cooking temperature of at least 160 degrees Fahrenheit to produce a cooked meat like product.

2. The method of claim 1, wherein cooking occurs in a steam tunnel.

3. The method of claim 1, further comprising the step of transferring a second transformed meat emulsion from the second scraped heat exchanger to a third scraped heat exchanger, wherein cooking occurs in the third scraped heat exchanger.

4. The method of claim 3, further comprising the step of transferring a third transformed meat emulsion from the third scraped heat exchanger to a steam tunnel.

5. The method of claim 1, further comprising transferring the cooked meat like product to a dicer to produce a meat like chunk.

6. The method of claim 1, wherein the first transformed meat emulsion has a temperature of from 130 to 150 degrees Fahrenheit.

7. The method of claim 1, wherein one or more of the steps of transforming by heat treating but not cooking includes establishing a temperature gradient along one or more of the first scraped heat exchanger and the second scraped heat exchanger.

8. The method of claim 1, wherein:
   the step of transforming by heat treating but not cooking the meat slurry using the first scraped heat exchanger includes operating the first scraped heat exchanger at a first temperature; and
   the step of transforming by heat treating but not cooking the meat slurry using the second scraped heat exchanger includes operating the second scraped heat exchanger at a second temperature.

9. The method of claim 8, wherein the second temperature is higher than the first temperature.

10. The method of claim 5, wherein the dicer is configured to cut the cooked meat like product into non-uniform shapes.

11. The method of claim 1, wherein the transforming temperatures comprise at least 100 degrees Fahrenheit and no greater than 150 degrees Fahrenheit.

12. The method of claim 1, wherein the cooking temperature further comprises at least 160 degrees Fahrenheit and no greater than 200 degrees Fahrenheit.

* * * * *